(12) United States Patent
Wang (10) Patent No.: US 7,866,002 B2
(45) Date of Patent: Jan. 11, 2011

(54) COMBINATIVE HANDLEBAR GRIP FOR BICYCLES OR THE LIKE

(76) Inventor: John Wang, No. 15-3, Nanbei 4th Rd., Dajia Town Taichung County 437 (TW)

( * ) Notice: Subject to any disclaimer, the term of this patent is extended or adjusted under 35 U.S.C. 154(b) by 313 days.

(21) Appl. No.: 12/204,833

(22) Filed: Sep. 5, 2008

(65) Prior Publication Data

US 2010/0058558 A1 Mar. 11, 2010

(51) Int. Cl.
*B25G 1/10* (2006.01)
(52) U.S. Cl. .......... 16/421; 16/436; 74/551.1; 74/551.8
(58) Field of Classification Search ......... 16/421, 16/426, 431, 436, DIG. 40, DIG. 41; 74/551.8, 74/551.9, 502.2
See application file for complete search history.

(56) References Cited

U.S. PATENT DOCUMENTS 5,301,570 A * 4/1994 Li ............... 74/551.1
6,021,688 A * 2/2000 Chang ........... 74/502.2
7,302,874 B2 * 12/2007 Chen ............ 74/502.2
2007/0157758 A1 * 7/2007 Shih ............ 74/551.9
2008/0307923 A1 * 12/2008 Lai ............. 74/551.8
2009/0031847 A1 * 2/2009 Grimes .......... 74/551.9

* cited by examiner

*Primary Examiner*—Chuck Mah (57) ABSTRACT

A handlebar grip capable of combining with or without an auxiliary handle is disclosed. Four first tongue plates in an annular arrangement extend from a main grip. There is a gap between two adjacent first tongue plates. Each first tongue plate has a first rib extending therefrom. A cap having second tongue plates corresponding to the first tongue plates is fixed on the outer end of the main grip by interlacing the tongue plates. A hitching ring is sandwiched between the cap and main grip to form an extended portion of the main grip. Each the second tongue plate has a second rib, which connects the first ribs to form an annular rib with the first ribs. The ring has an annular groove to receiving the annular rib and to engage the main grip and cap. The ring may be changed into a horn shape as an auxiliary handle.

12 Claims, 7 Drawing Sheets

COMBINATIVE HANDLEBAR GRIP FOR BICYCLES OR THE LIKE

FIELD OF THE INVENTION

The present invention relates to bicycles, particularly to bar grips for bicycles.

BACKGROUND OF THE INVENTION

For purposes of exercise and energy-saving and carbon reduction, cycling has become the fashion or trend worldwide. Whether as a vehicle or as a sports equipment, bicycles are indispensable.

Currently, mountain bikes (MTB) are the central type of bicycles. Some users of the MTBs like to additionally install an erect auxiliary handle (also "horn") at an outer end of a handlebar grip. Such an auxiliary handle can provide an alternative holding gesture to bicycle riders. However, the auxiliary handles are always solely sold as an optional good in after market. Thus no cooperative design is made between the auxiliary handles and the grip. The installation of the auxiliary handle requires cutting an outer portion of the grip, whose width is the same as the auxiliary handle's, to expose the handlebar so that the auxiliary handle can then be fixed on the exposed portion. Such an installation requires using a knife to cut a tube-like object. For general users, there is some danger of injury in the operation. Furthermore, the cutting edge is difficult to be made neat. Irregular or notched cutting edges tend to be left. Exterior handsomeness must be adversely affected. On the other side, once the auxiliary handle is installed, the cut portion will be exposed again if the user removes the auxiliary handle. In other words, the original state of the grip can not be restored. The only solution is to replace the grip. Users can not make a reversible choice between installing and uninstalling the auxiliary handle. For users of bicycles, their choice for changing a handlebar grip is considerably restricted.

SUMMARY OF THE INVENTION

A primary object of the present invention is to provide a combinative handlebar grip for bicycles or the like, which adopts combinative design to allow users or manufactures to have a free choice of installing or uninstalling an auxiliary handle without limits.

Another object of the present invention is to provide a combinative handlebar grip for bicycles or the like, which has a sense of integrality whether with or without installing an auxiliary handle.

Another object of the present invention is to provide a combinative handlebar grip for bicycles or the like, which does not require any cutting operation when installing an auxiliary handle. Therefore, uneven cutting edges will not result, and there is no risk of using knives.

To accomplish the objects abovementioned, the present invention provides a combinative handlebar grip for bicycles. Four first tongue plates in an annular arrangement extend from a main grip. There is a gap between two adjacent first tongue plates. Each first tongue plate has a first rib extending therefrom. A cap having second tongue plates corresponding to the first tongue plates is fixed on the outer end of the main grip by interlacing the tongue plates. A hitching ring is sandwiched between the cap and main grip to form an extended portion of the main grip. Each the second tongue plate has a second rib, which connects the first ribs to form an annular rib with the first ribs. The ring has an annular groove to receiving the annular rib and to engage the main grip and cap. The ring may be changed into a horn shape as an auxiliary handle.

BRIEF DESCRIPTION OF THE DRAWINGS

Hereinafter the invention will be explained in detail with respect to preferred embodiments thereof with reference to the accompanying drawings.

In the Figures.

DETAILED DESCRIPTION OF THE INVENTION

Figure 1:
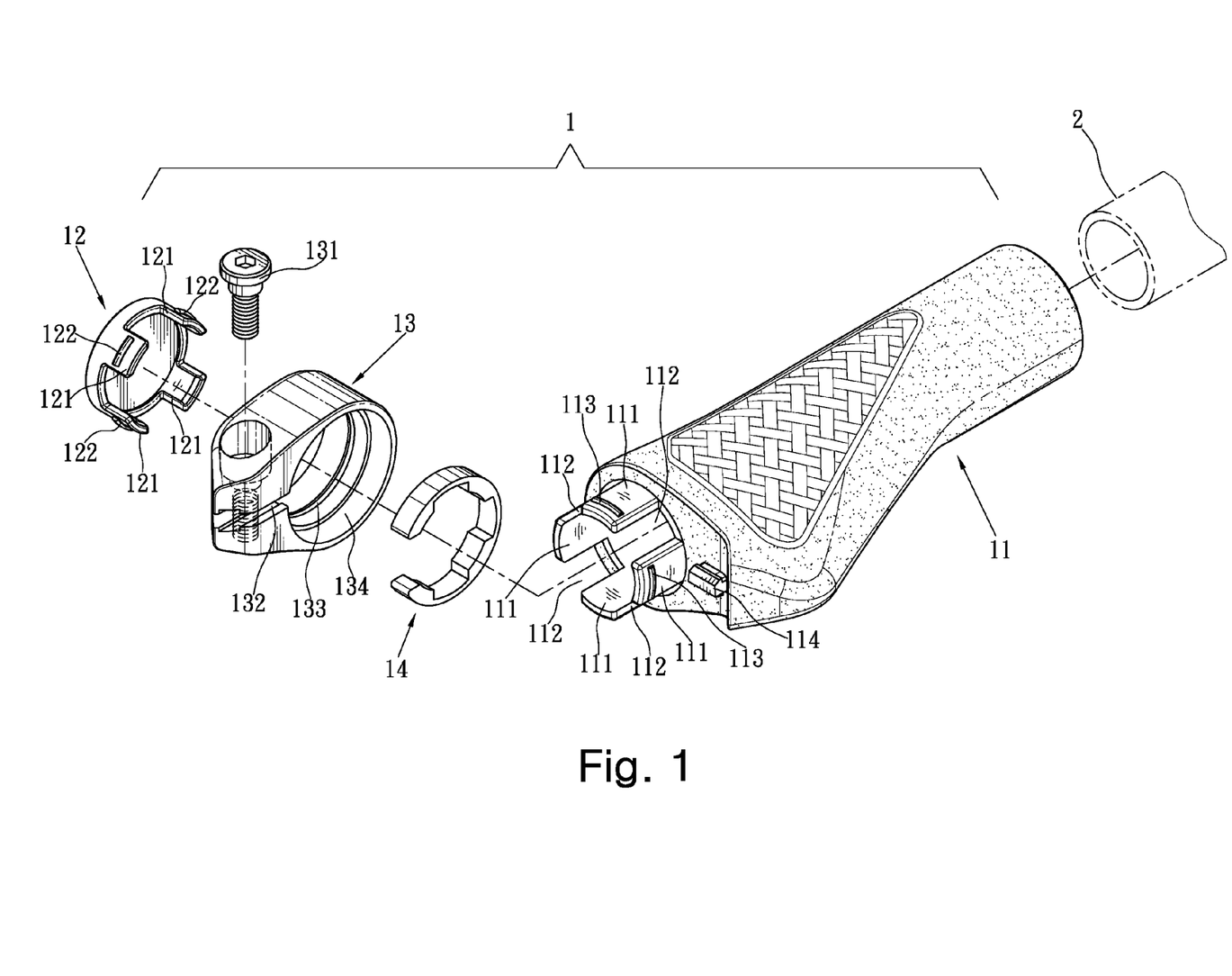
FIG. 1 is an exploded view of the handlebar grip according to the present invention when using a loop-typed hitching ring.

Referring to FIG. 1, the present invention is a handlebar grip 1 mounted on a handlebar 2 of a bicycle. The handlebar grip 1 includes a main grip 11 as a main body for holding. An outer end of the main grip 11 extends outwards to form a plurality of first tongue plates 111, which are disposed in an annular arrangement. In a preferred embodiment as shown in FIG. 1, the number of the first tongue plates 111 is, but not limited to, four. There is a gap 112 between any adjacent two of the first tongue plates 111. All the gaps 111 are equal in width. An outer portion of each of the first tongue plates 111 is provided with a transverse first rib 113. The first ribs 113 are symmetrical and concyclic. A cap 12 for covering the outer end of the main grip 11 is provided with second tongue plates 121 corresponding to the first tongue plates 111. The cap 12 can be mounted on the outer end of the main grip 11 by interlacing the first and second tongue plates 111, 121. The second tongue plates 121 also have second ribs 122 corresponding to the first ribs 113. The first and second ribs 113, 122 jointly compose an annular rib.

Figure 2:
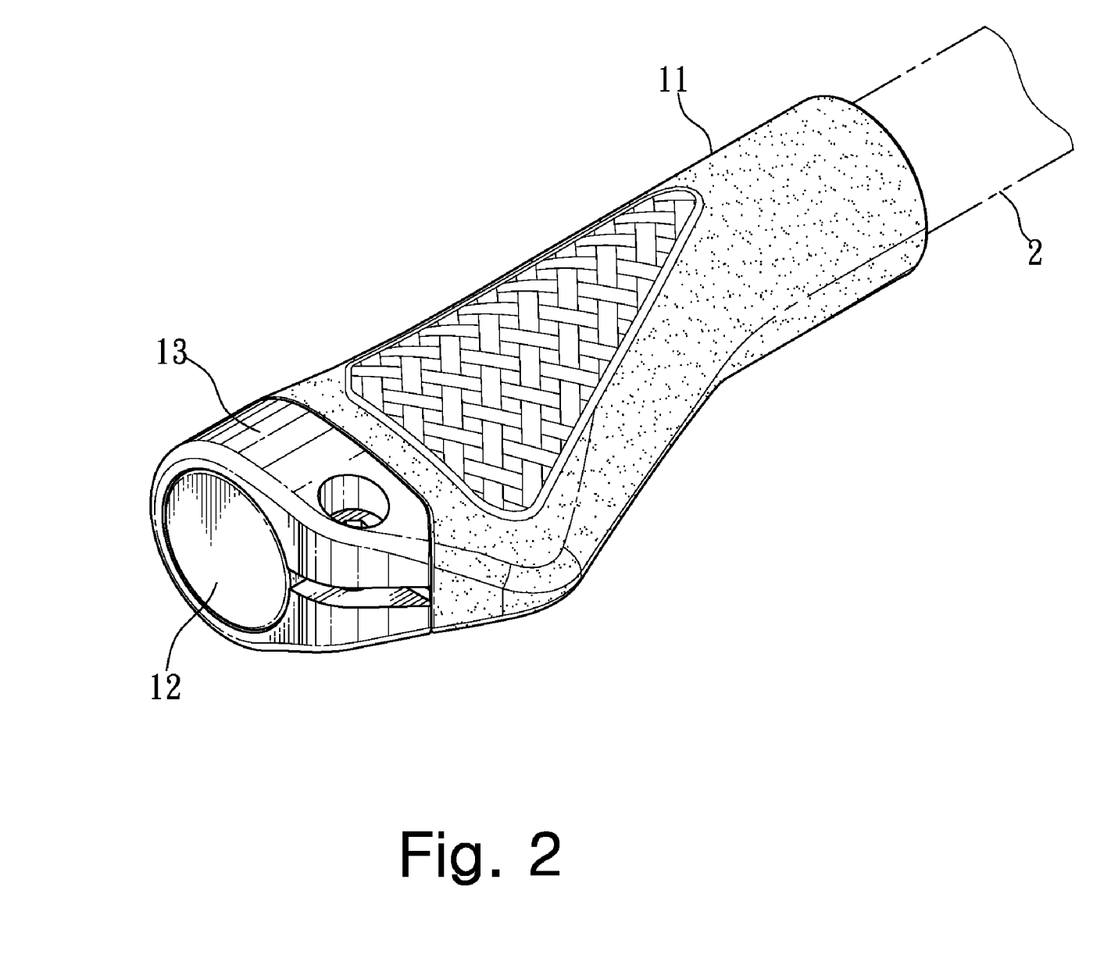
FIG. 2 is a perspective view of the handlebar grip according to the present invention when using a loop-typed hitching ring in the assembled state.

A hitching ring 13, which is an open ring with an opening 132, is sandwiched between the cap 12 and the main grip 11. The opening 132 is passed through by a screw 131 for fastening. An inner wall of the hitching ring 13 has an annular slot 133 for accommodating the annular rib composed of the first and second ribs 113, 122. The hitching ring 13 can firmly engage the main grip 11 and the cap 12 by rabbet of the annular slot 133 and the annular rib when the hitching ring 13 is fastened by the screw 131. Preferably, a C-shaped binding ring 14 may be disposed outside a root portion of the first tongue plates 111. The binding ring 14 has an up-and-down inner side corresponding to the first tongue plates 111 and the gap 112 for fastening the first tongue plates 111. The binding ring 14 can also fasten the handlebar 2 because part of the inner side of the binding ring 14 simultaneously contacts the handlebar 2. Besides, the hitching ring 13 has a recess 134 corresponding to the binding ring 14, so that the binding ring 14 can be accommodated in the recess 134. The binding ring 14 can enhance the girding effect onto the first and second tongue plates 111, 121 and the handlebar 2 when the hitching ring 13 is fastened by the screw 131. FIG. 2 shows an exterior of the handlebar grip according to the invention in an assembled state. It can be apparently seen that the hitching ring 13 closely connects the main grip 11 and follows the shape of the main grip 11 to extend for forming an extension thereof. The combination of the main grip 11 and the hitching ring 13 appears integral.

Figure 3:
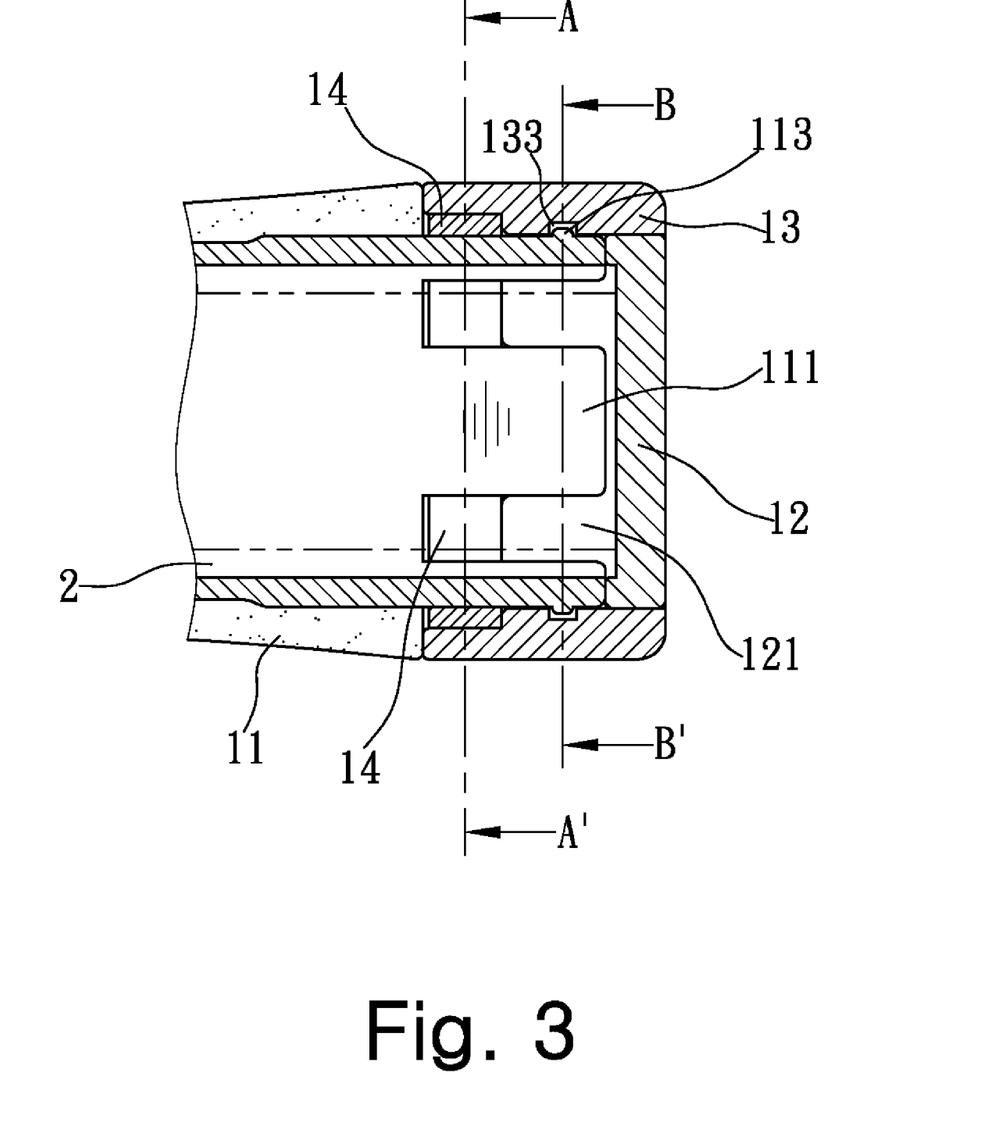
FIG. 3 is a longitudinal sectional view of the handlebar grip according to the present invention when using a loop-typed hitching ring in the assembled state.
Figure 4A:
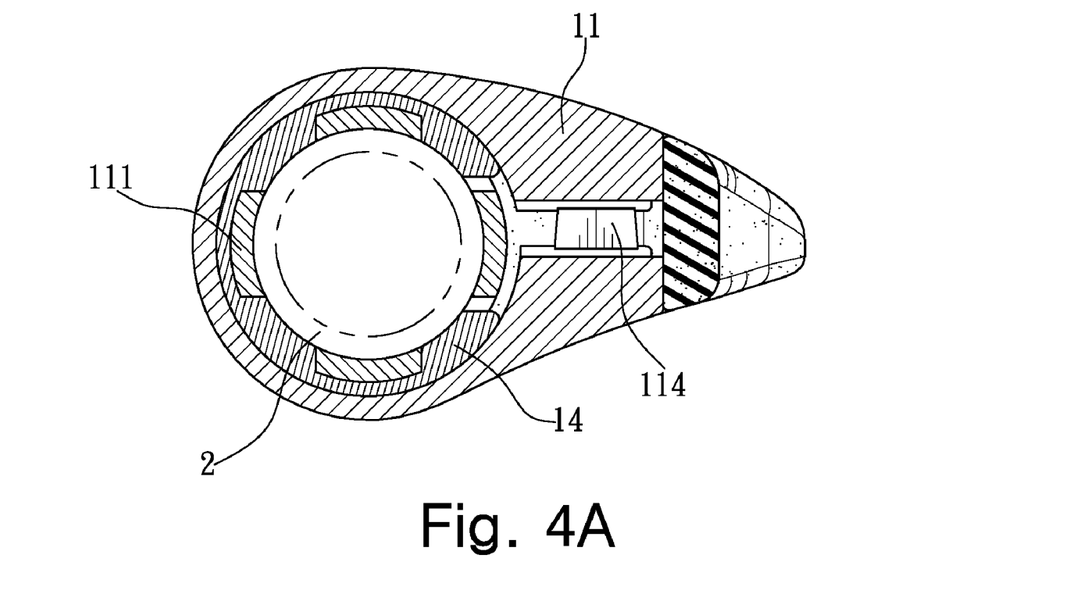
FIGS. 4A and 4B are transverse sectional views along the lines A-A' and B-B' of FIG. 3 respectively.
Figure 4B:
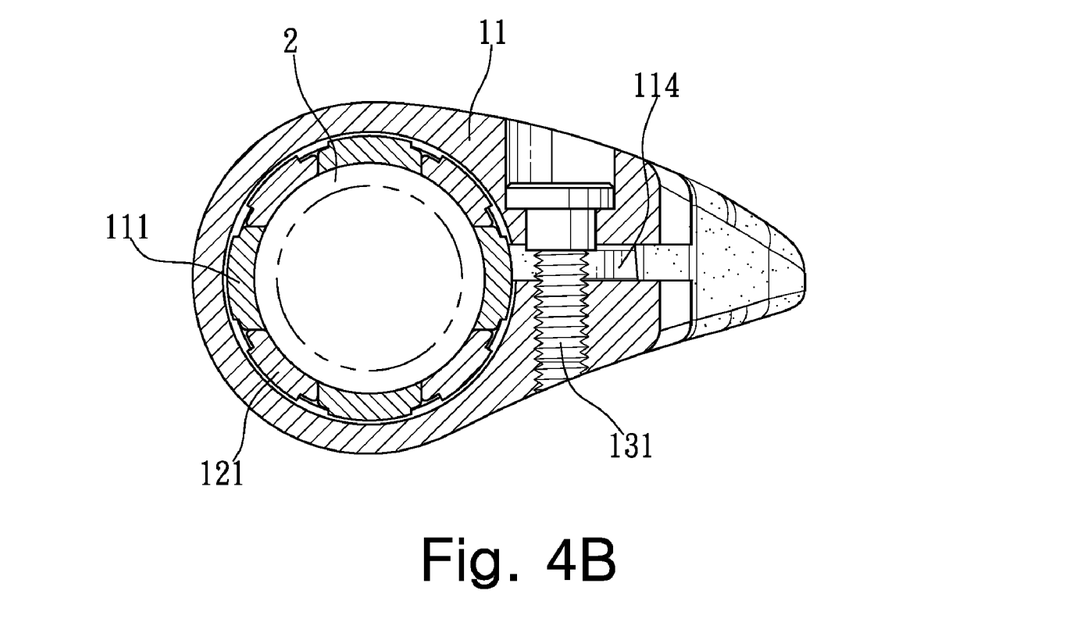

FIG. 3 is a longitudinal sectional view of the handlebar grip according to the present invention. The binding ring 14 and the annular rib (first ribs 113) infix the recess 134 and the annular slot 133 of the hitching ring 13, respectively. Therefore, the main grip 11, hitching ring 13 and cap 12 can be firmly fastened. As shown in FIG. 3, the length of the gap 112 is approximately equal to the sum of the width of the binding ring 14 and the length of the second tongue plate 121, so that the binding ring 14 and the second tongue plates 121 can completely fill the gap 112. FIG. 4A and 4B are transverse sectional views along the lines A-A' and B-B' of FIG. 3 respectively, which can further show the rabbet state of the first tongue plates 111, the second tongue plates 121 and the binding ring 14.

Figure 5:
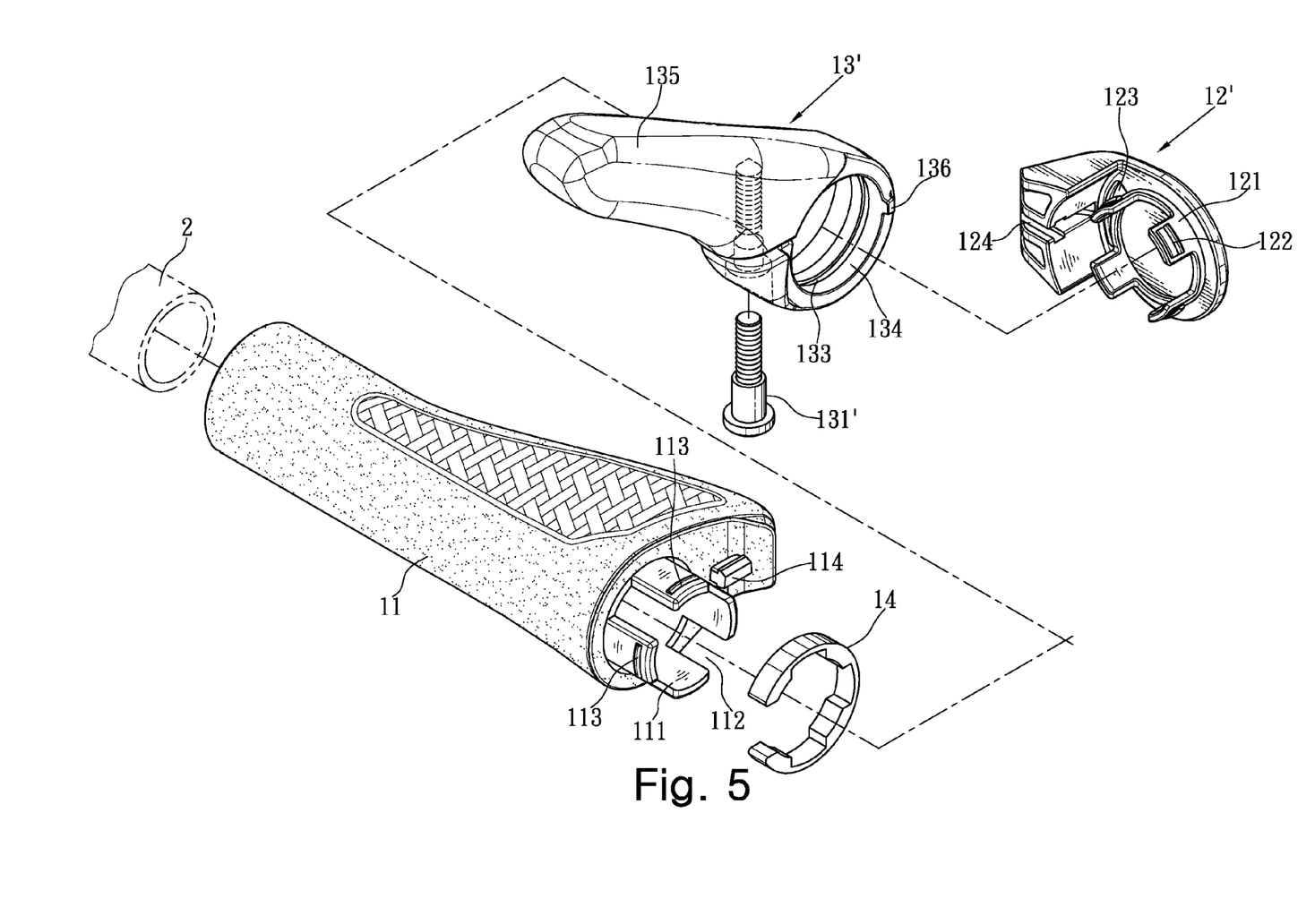
FIG. 5 is an exploded view of the handlebar grip according to the present invention when using a horn-typed hitching ring.
Figure 6:
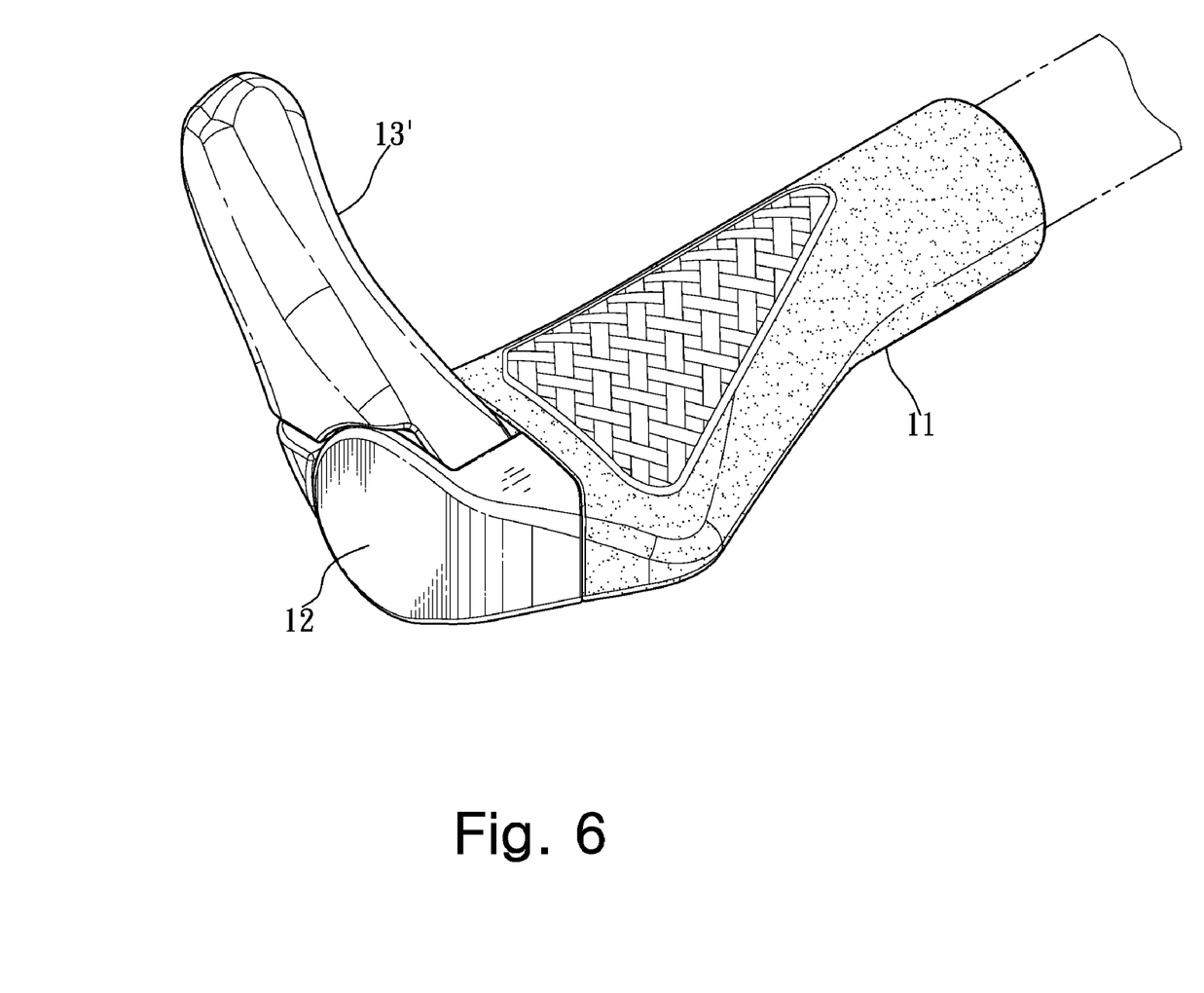
FIG. 6 is a perspective view of the handlebar grip according to the present invention when using a horn-typed hitching ring in the assembled state.

In above description, the hitching ring 13 is a pure ring, but it may be formed as a horn-typed auxiliary handle. A user can freely select either of the two types of hitching ring if he or she owns them both. As shown in FIG. 5, the main grip 11, binding ring 14 and cap 12' substantially remain the same but the shape of the cap 12' may slightly change for matching that of the horn-typed hitching ring 13'. However, this is an exterior change instead of a structural one. The horn-typed hitching ring 13' is to extend a horn 135 from one side of the ring body. The horn-typed hitching ring 13' can be used as an auxiliary handle. The length of the screw 131' needs to be slightly prolonged for matching the thickness of the horn 135. The horn-typed hitching ring 13' is fastened by the same manner and may be rotated to adjust its angle before being fastened by the screw 131'. FIG. 6 shows a perspective view of the handlebar grip with the horn-typed hitching ring 13'.

In a preferred embodiment as shown in FIG. 5, a block 114 overhangs from the outer end of main grip 11 and the inner side of the cap 12' is provided with a groove 124 corresponding to the block 114. The main grip 11 and the cap 12' can not rotate mutually by the block 114 inserting into the groove 124, so that the main grip 11 and the cap 12' can constantly match with each other in exterior.

Figure 7A:
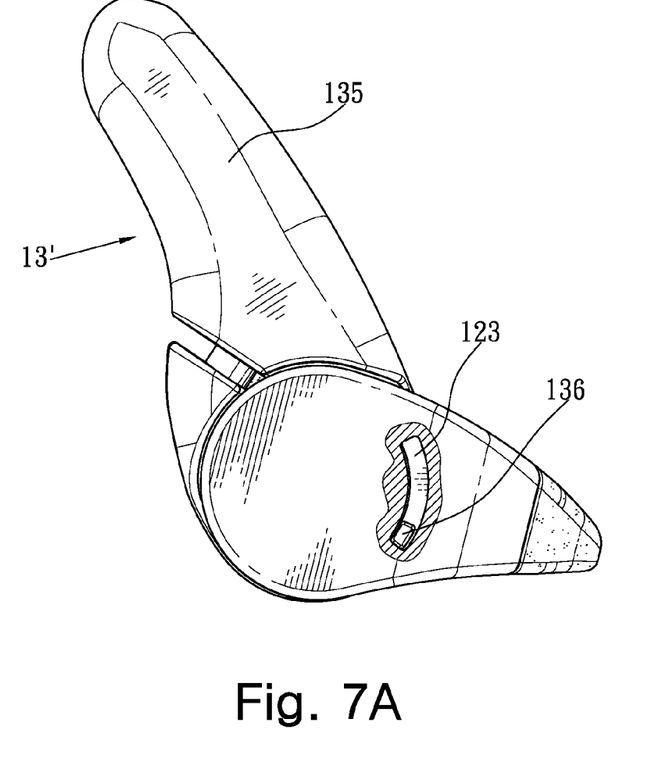
FIGS. 7A and 7B are two side views of the handlebar grip according to the present invention when using a horn-typed hitching ring in the assembled state, partially in section for showing the limiting effect of the blocker and notch.
Figure 7B:
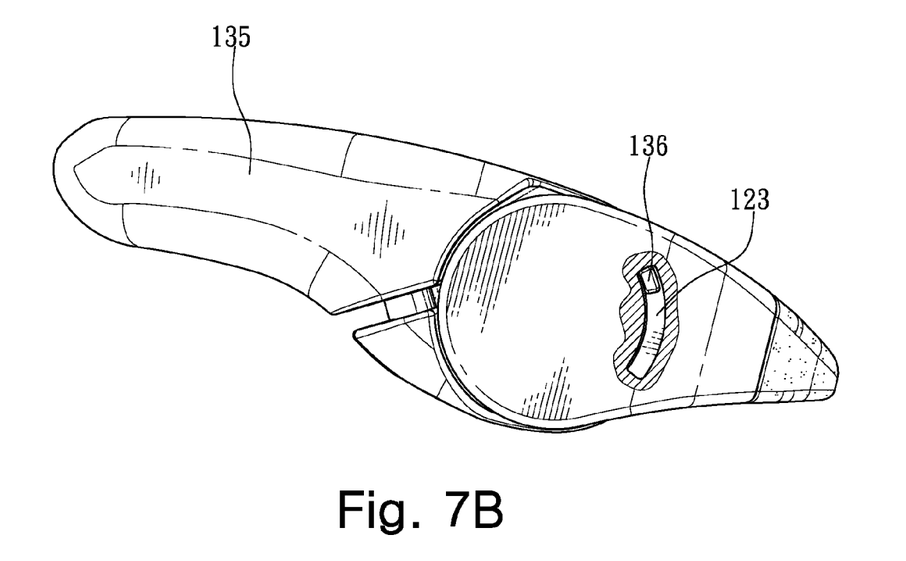

In a preferred embodiment according to the invention, a blocker 136 is disposed on the side, which faces the cap 12', of the ring portion of the horn-typed hitching ring 13', and the inner side of the cap 12' is provided with a notch 123 for receiving the blocker 136. The rotation of the horn-typed hitching ring 13' is limited by the blocker 136 and the notch 123 within the angular range defined by the notch 136. FIGS. 7A and 7B shows the limiting effect of the blocker 136 and notch 123.

In sum, the invention allows users and manufactures of bicycles freely selecting to add or not to add an auxiliary handle. And either selection has a sense of integrality. Furthermore, no cutting operation is required. It can be said that the invention is a convenient and economical design.

While the invention has been shown and described in terms of a preferred embodiment thereof, it will be understood that this invention is not limited to this particular embodiment and that many changes and modifications may be made without departing from the true spirit and scope of the invention as defined in the appended claims.

What is claimed is:

1. A handlebar grip for bicycles comprising:
   a main grip having a plurality of first tongue plates being in an annular arrangement and extending from an outer end of the main grip, and a gap being between any adjacent two of the first tongue plates;
   a cap having a plurality of second tongue plates corresponding to the first tongue plates, wherein the cap is mounted on the outer end of the main grip by interlacing of the first and second tongue plates; and
   a hitching ring, having an opening, sandwiched between the cap and the main grip, annularly hitching the interlaced first and second tongue plates, and the opening being provided with a screw for fastening, wherein the hitching ring engages the first and second tongue plates by fastening the screw;
   wherein each of the first tongue plates is provided with a transverse first rib which is concyclic with each other, each of the second tongue plates is provided with a second rib corresponding to the first ribs, the first and second ribs forming an annular rib, and an inner side of the hitching ring having an annular slot for receiving the annular rib.

2. The handlebar grip as claimed in claim 1, wherein the first and second tongue plates are four in number separately.

3. The handlebar grip as claimed in claim 1, wherein the gaps are equal in width.

4. A handlebar grip for bicycles comprising:
   a main grip having a plurality of first tongue plates being in an annular arrangement and extending from an outer end of the main grip, and a gap being between any adjacent two of the first tongue plates;
   a cap having a plurality of second tongue plates corresponding to the first tongue plates, wherein the cap is mounted on the outer end of the main grip by interlacing of the first and second tongue plates;
   a hitching ring, having an opening, sandwiched between the cap and the main grip, annularly hitching the interlaced first and second tongue plates, and the opening being provided with a screw for fastening, wherein the hitching ring engages the first and second tongue plates by fastening the screw;
   a C-shaped binding ring, disposed outside a root portion of the first tongue plates, having an up-and-down inner side corresponding to the first tongue plates and the gap for fastening the first tongue plates; and
   a recess on an inner side of the hitching ring for accommodating the binding ring.

5. The handlebar grip as claimed in claim 4, wherein the first and second tongue plates are four in number separately.

6. The handlebar grip as claimed in claim 4, wherein the gaps are equal in width.

7. A handlebar grip for bicycles comprising:
   a main grip having a plurality of first tongue plates being in an annular arrangement and extending from an outer end of the main grip, and a gap being between any adjacent two of the first tongue plates;
   a cap having a plurality of second tongue plates corresponding to the first tongue plates, wherein the cap is mounted on the outer end of the main grip by interlacing of the first and second tongue plates;
   a hitching ring, having an opening, sandwiched between the cap and the main grip, annularly hitching the interlaced first and second tongue plates, and the opening being provided with a screw for fastening, wherein the hitching ring engages the first and second tongue plates by fastening the screw and extends a horn from one side thereof to form a horn-typed hitching ring for using as an auxiliary handle;

a blocker disposed on a side, which faces the cap, of a ring portion of the horn-typed hitching ring; and a notch on an inner side of the cap for receiving the blocker;

whereby a rotation of the horn-typed hitching ring is limited by the blocker and the notch within the angular range defined by the notch.

8. The handlebar grip as claimed in claim 7, wherein the first and second tongue plates are four in number separately.

9. The handlebar grip as claimed in claim 7, wherein the gaps are equal in width.

10. A handlebar grip for bicycles comprising:

a main grip having a plurality of first tongue plates being in an annular arrangement and extending from an outer end of the main grip, and a gap being between any adjacent two of the first tongue plates;

a cap having a plurality of second tongue plates corresponding to the first tongue plates, wherein the cap is mounted on the outer end of the main grip by interlacing of the first and second tongue plates;

a hitching ring, having an opening, sandwiched between the cap and the main grip, annularly hitching the interlaced first and second tongue plates, and the opening being provided with a screw for fastening, wherein the hitching ring engages the first and second tongue plates by fastening the screw and extends a horn from one side thereof to form a horn-typed hitching ring for using as an auxiliary handle;

a block overhanging from the outer end of main grip; and a groove on an inner side of the cap for receiving the block;

whereby the main grip and the cap can not rotate mutually by the block inserting into the groove.

11. The handlebar grip as claimed in claim 10, wherein the first and second tongue plates are four in number separately.

12. The handlebar grip as claimed in claim 10, wherein the gaps are equal in width.

* * * * *